United States Patent [19]
Highland

[11] 4,291,589
[45] Sep. 29, 1981

[54] SHIFTING LEVER BRAKES OFF RESTRICTION LATCH

[75] Inventor: Edward Highland, Springfield, Ill.

[73] Assignee: Fiat-Allis Construction Machinery, Inc., Deerfield, Ill.

[21] Appl. No.: 95,162

[22] Filed: Nov. 19, 1979

[51] Int. Cl.³ .................... G05G 5/06; F16D 67/00
[52] U.S. Cl. .................................. 74/526; 192/4 A
[58] Field of Search ............. 192/4 R, 4 A; 74/476, 74/526

[56] References Cited

U.S. PATENT DOCUMENTS

| 1,223,906 | 4/1917 | Schermerhorn | 192/4 A |
| 1,740,725 | 12/1929 | Brown | 74/526 X |
| 1,760,347 | 5/1930 | Craig | 74/526 |
| 3,522,746 | 8/1970 | Reynolds | 74/526 |
| 3,779,614 | 12/1973 | Hughes | 74/476 X |

Primary Examiner—Allan D. Herrmann
Attorney, Agent, or Firm—August E. Roehrig, Jr.; Robert A. Brown; John A. Doninger

[57] ABSTRACT

A safety device for blocking out a portion of a transmission gear shift pattern to prevent a transmission gear shift lever from being inadvertently placed into a particular position. A spring-biased release latch is used to physically block off the gear position thereby preventing the gear shift lever from entering that position. In order to enter this gear position, the vehicle operator must first manually pivot the spring-biased latch. Upon removing the gearshift lever from this position after being placed therein, the release latch will spring back into place to again block off that gear position.

2 Claims, 3 Drawing Figures

SHIFTING LEVER BRAKES OFF RESTRICTION LATCH

BACKGROUND OF THE INVENTION

This invention relates in general to safety devices for vehicles and, in particular, to a locking device for use with the transmission of a self-propelled vehicle. More specifically, but without restriction to the particular use which is shown and described, this invention relates to a restriction latch device that prevents a transmission gear shift lever of a vehicle from accidentally or inadvertently being placed into a neutral position that permits the vehicle to be moved from one location to another.

Self-propelled vehicles, such as construction machinery and earth moving vehicles, utilize a transmission to couple the output of the vehicle engine to a drive system. The transmission is manually operated by the vehicle operator by moving a transmission or gear shift lever which is freely moveable through various positions to change the output of the transmission. Such transmissions have a gear shift pattern which describes a physical layout of the various positions that the gear shift lever can move through in order to change the output from the transmission. Generally, the gear shift pattern has positions which correspond to the drive gears of the vehicle, i.e., forward and reverse, and a position corresponding to the transmission being in neutral.

Certain types of construction machinery require two gear shift positions when the vehicle transmission is in neutral. One gear shift position corresponds to a "BRAKES ON" position wherein the vehicle transmission is in neutral, but the brakes are applied to prevent any movement. Normally, when these vehicles are being started the transmission gear shift lever is placed into this "BRAKES ON" position in the gear shift pattern. For safety this allows the vehicle to be started while the brakes are locked. The other neutral position is a "BRAKES OFF" position, wherein the vehicle transmission is in neutral, but the brakes are not applied. This position allows the vehicle to be moved, such as when the vehicle is to be loaded onto another vehicle for transport to a job site. By placing the gear shift lever into the "BRAKES OFF" neutral position, the vehicle can be easily towed or pushed by another vehicle to a desired location.

Due to space limitations imposed by the vehicle transmission, the "BRAKES OFF" and "BRAKES ON" positions are in close proximity. Therefore, the vehicle operator might unintentionally shift the transmission into the "BRAKES OFF" position when intending that the vehicle be shifted into the "BRAKES ON" position which could cause damage and/or bodily injury. To eliminate the potential hazard which might occur in the event that the vehicle operator unintentionally or accidentally placed the transmission gear shift lever into the "BRAKES OFF" position, the present invention prevents the gear shift lever from being inadvertently placed into this position.

The invention utilizes a spring-biased restriction latch to prevent the gear shift lever from being accidentally or unintentionally put into the "BRAKES OFF" position. In order for the vehicle operator to move the gear shift lever into the "BRAKES OFF" position, the operator must first manually rotate a release latch into a position in which it is no longer a physical barrier for the gear shift lever. The gear shift lever can be then shifted into the "BRAKES OFF" position. Upon release by the operator, the release latch, being spring biased, will move to a closed position.

When the vehicle operator then wishes to move the gear shift lever from the "BRAKES OFF" position, the operator merely moves the gear shift lever into contact with the release latch and it can be rotated into an open position. The operator can then freely move the gear shift lever from the "BRAKES OFF" position to any desired gear position. The release latch will again be spring biased back into its original position setting up the physical barrier to prevent the gear shift lever from being inadvertently placed back into the "BRAKES OFF" position.

SUMMARY OF THE INVENTION

It is, therefore, an object of this invention to inhibit the transmission gear shift lever from movement into certain gear positions.

Another object of this invention is to prevent the transmission gear shift lever from being inadvertently placed into certain positions.

These and other objects are attained in accordance with the present invention wherein there is provided a safety device for blocking a portion of a transmission gear shift pattern to prevent a transmission gear shift lever from being inadvertently placed into a particular position. A spring-biased release latch is used to physically block the gear position thereby preventing the gear shift lever from entering into that position. In order to enter this gear position, the vehicle operator must first manually pivot the spring-biased latch. Upon removing the gear shift lever from this position, after being placed therein, the release latch will spring back into place to again block that gear position.

DESCRIPTION OF THE DRAWINGS

Further objects of the invention together with additional features contributing thereto and advantages accruing therefrom will be apparent from the following description of the preferred embodiment of the invention which is shown in the accompanying drawings with like references numerals indicating corresponding parts throughout, wherein.

DESCRIPTION OF THE PREFERRED EMBODIMENTS

Figure 1:
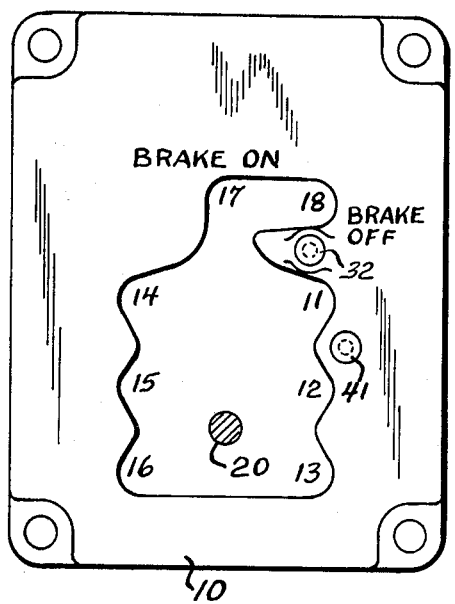
FIG. 1 shows a top plan view of the physical layout of a gear shift pattern showing the various gear positions into which the gear shift may be placed to effect vehicle operation.

Referring to FIG. 1, there is shown an illustration of a typical gear shift pattern bound by a transmission cover plate 10, showing various positions 11, 12, 13, 14, 15, 16, 17 and 18 into which a gear shift lever 20 of a vehicle transmission (not shown) may be placed. For convenience of illustration, the safety device of the present invention is disclosed in conjunction with a vehicle transmission which utilizes three forward gears: first 11, second 12, and third 13; three reverse gears: first 14, second 15, and third 16; and two neutral positions: neutral "BRAKES ON" 17 and neutral "BRAKES OFF" 18. However, it is to be understood that the invention is not intended to be so limited, but it is suitable for use with vehicle transmissions having additional and/or other gear drive positions or gear shift patterns.

As is known to those skilled in the art, the transmission of a self-propelled vehicle is controlled by the shift lever 20 which is freely movable throughout the various gear positions 11–18 of the transmission. As shown by the solid lines in FIG. 2, the gear shift lever 20 is positioned in the neutral "BRAKES ON" position 17 whereby the transmission is in neutral, and the vehicle brakes are automatically applied to prevent vehicle movement. The gear shift pattern also includes another neutral position; the "BRAKES OFF" position 18. When the shift lever 20 is placed into position 18 (as shown by the dotted lines on FIG. 2), the vehicle transmission is also in neutral, but the brakes are not engaged. This will allow the vehicle to move or be moved.

In order to prevent the gear shift lever 20 from being inadvertently placed into the "BRAKES OFF" position 18, a spring-biased release latch 30 acts as a physical barrier to prevent the shift lever 20 from entering the neutral "BRAKES OFF" position 18. The release latch 30 comprises an L-shaped plate or bell crank 31 which is supported from cover plate 10 by a pin 32 for pivotal movement in an adjacent plane substantially parallel thereto.

Figure 2:
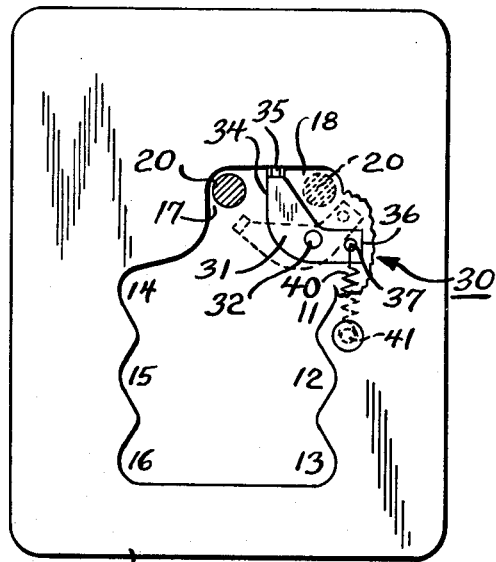
FIG. 2 is a top plan view as that in FIG. 1, showing a spring-biased release latch used to lock out one of the gear positions of the gear shift pattern.
Figure 3:
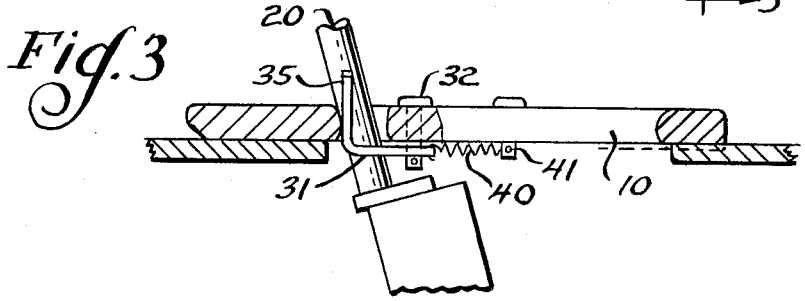
FIG. 3 is a side sectional view of the latch and gear shift pattern shown in FIG. 2 taken along lines 3—3.

When the latch 30 is in a closed position as shown by the solid lines in FIG. 2, a stop arm 34 of the bell crank 31 blocks the gear shift lever from being placed in the neutral "BRAKES OFF" position 18. A return arm 36, of the bell crank 31, has an aperture 37 in which one end of a spring 40 is secured. The other end of the spring 40 is fixedly secured by a pin 41 to an adjacent support structure carried by the cover plate 10. The spring 40 functions to maintain the latch 30 in the closed position. A vertical arm 35 (best shown in FIG. 3) extends upwardly from stop arm 34 in a plane perpendicular to the planes of the bell crank 31 and cover plate 10. The spring biasing of arm 35 against an inner peripheral portion of the cover plate 10 will block the neutral "BRAKES OFF" position 18 to prevent the gear shift lever 20 from unintentionally or accidentally entering this position. When arm 35 is manually pivoted by the vehicle operator, the bell crank 31 will be caused to pivot about the pin 32 providing access to this position.

When the vehicle operator desires to move the gear shift lever 20 into the neutral "BRAKES OFF" position 18, he must manually pivot the arm 35 of the latch 30 in a counterclockwise direction. The latch 30 will thereby be pivoted against the force of spring 40, until the stop arm 34 of the bell crank 31 moves to an open position shown in phantom in FIG. 2. The vehicle operator can then move the gear shift lever 20 into the neutral "BRAKES OFF" position 18. When the operator releases the arm 35, the bell crank 31 will pivot back into the closed position under the biasing action of the spring 40.

In order for the vehicle operator to remove the gear shift lever 20 from the neutral "BRAKES OFF" position 18 to place it in one of the other gear positions, 11-17, the operator moves the lever 20 into contact with the arm 35 which is thereby pivoted to place the latch 30 in the open position so that the shift lever 20 can be removed. The bell crank 31 will then spring back into its closed position after the gear shift lever 20 moves out from contact with the arm 35. The neutral "BRAKES OFF" position 18 will again be blocked, thus preventing the inadvertent or accidental placement of the shift lever 20 in position 18.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A safety device for use with the transmission gear shift levers of a vehicle to prevent inadvertent placement of a transmission gear shift lever into one of the positions in the gear shift pattern comprising latching means comprising a bell crank having a first arm thereof forming a barrier member and a second arm thereof forming a biasing member, said bell crank being pivotably supported about an axis disposed substantially perpendicular to the plane of said gear shift pattern at the juncture of said first and second arms adjacent to the gear shift pattern of a vehicle, said first arm barrier member having a latch portion extending co-planar to said second arm biasing member for being urged to a position to physically isolate one position of the transmission gear shift pattern and prevent movement by the transmission shift lever into said position, said first arm barrier member of said bell crank latching means further includes a manually operable release means extending upwardly from and substantially perpendicular to said latch portion to selectively move said latch portion of said first arm barrier member from said isolation position to an open position to permit the transmission gear shift lever to enter or leave said isolated position, and spring means secured to a free end of said second arm biasing member to bias said latch portion of said first arm barrier member into a position physically isolating the one position of the transmission gear shift pattern.

2. The apparatus of claim 1 further including a transmission cover plate defining the outer limits of the gear shift pattern throughout which the transmission shift lever may be moved, and said spring means biasing said latch portion of said first arm barrier member against said transmission cover plate to isolate the one position of the transmission gear shift pattern.

* * * * *